W. J. PERKINS.
AUTOMATIC TEMPERATURE REGULATING DEVICE FOR INCUBATORS.
APPLICATION FILED SEPT. 29, 1913.
1,162,947.
Patented Dec. 7, 1915.
4 SHEETS—SHEET 1.
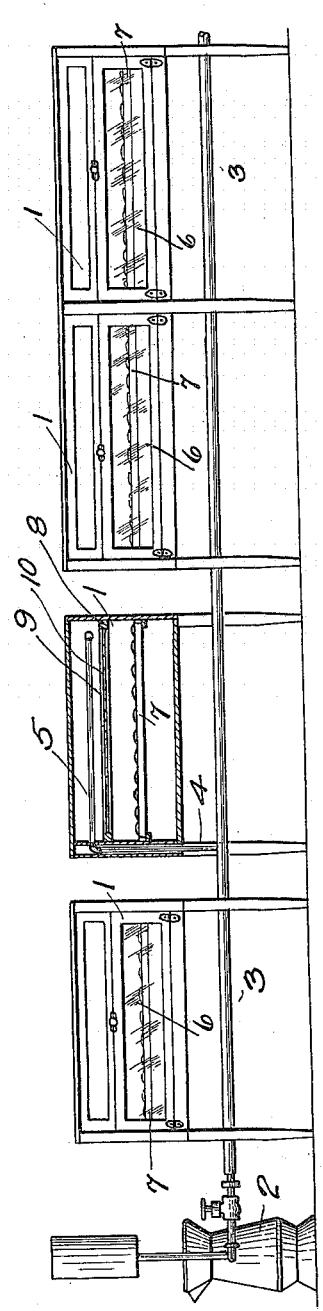
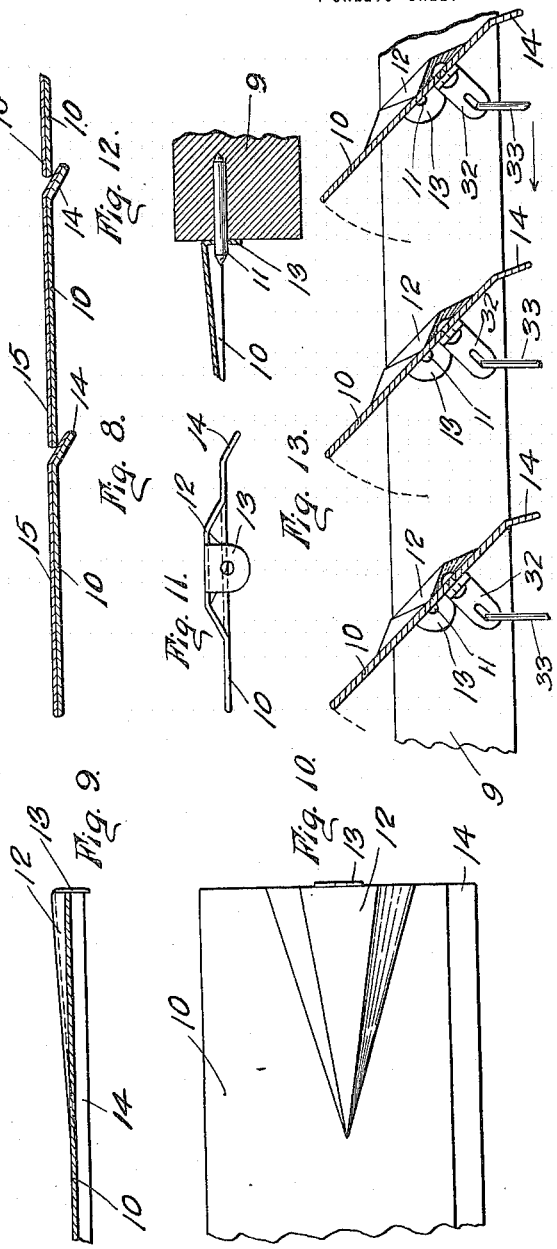

W. J. PERKINS.
AUTOMATIC TEMPERATURE REGULATING DEVICE FOR INCUBATORS.
APPLICATION FILED SEPT. 29, 1913.
1,162,947.
Patented Dec. 7, 1915.
4 SHEETS—SHEET 2.
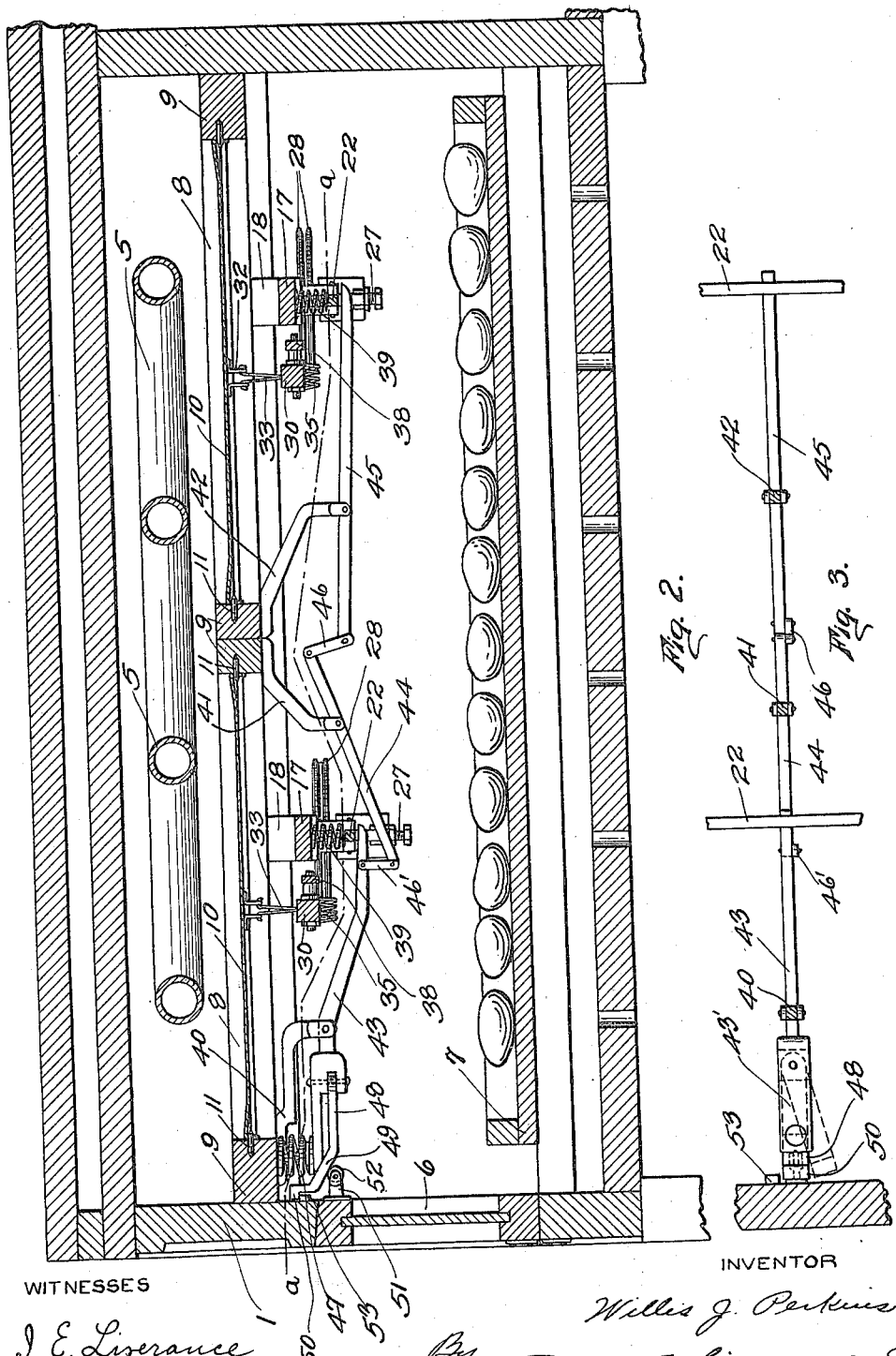

W. J. PERKINS.
AUTOMATIC TEMPERATURE REGULATING DEVICE FOR INCUBATORS.
APPLICATION FILED SEPT. 29, 1913.

1,162,947.

Patented Dec. 7, 1915.
4 SHEETS—SHEET 3.

WITNESSES

INVENTOR
Willis J. Perkins
By Frank E. Liverance, Jr.
Attorney.

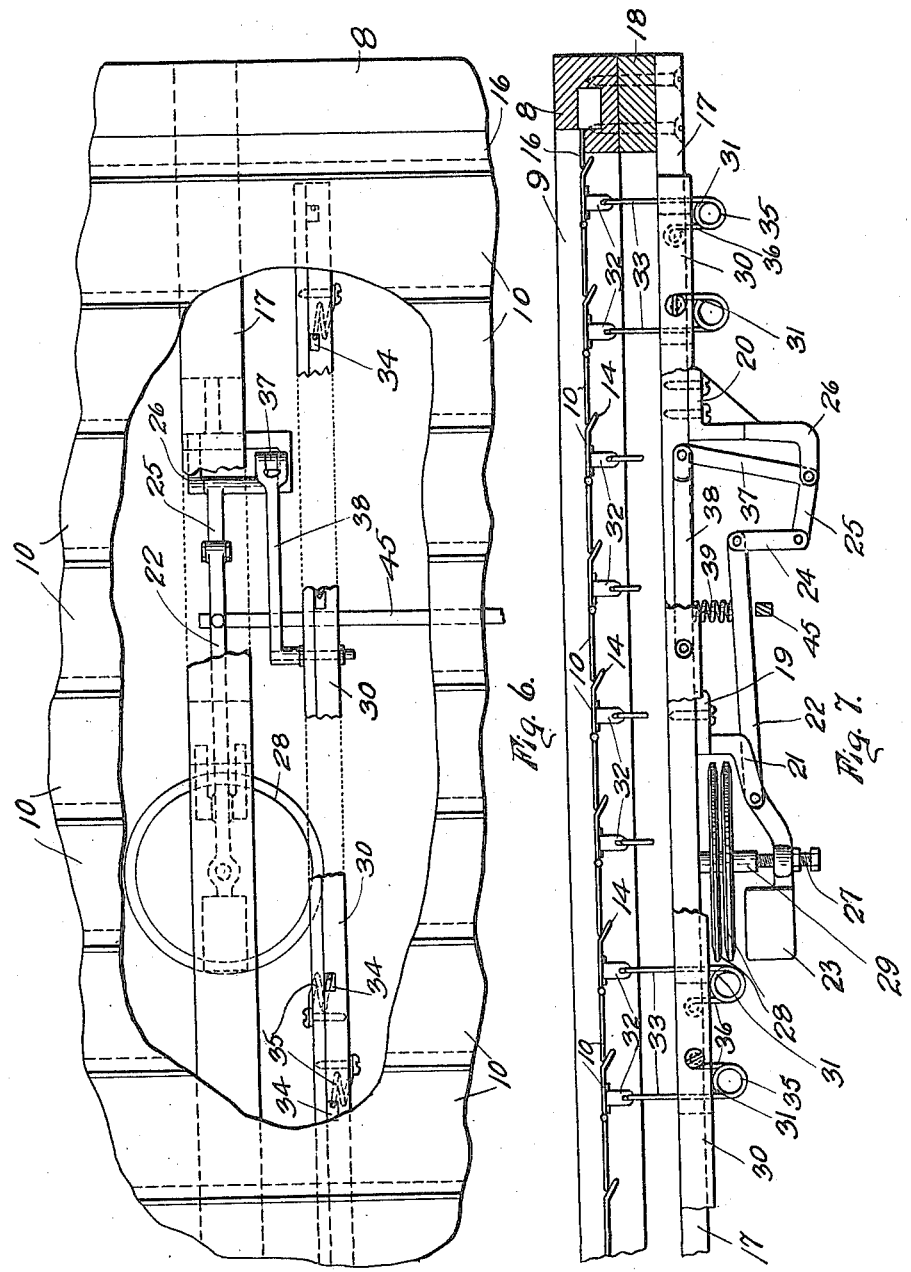

UNITED STATES PATENT OFFICE.

WILLIS J. PERKINS, OF GRAND RAPIDS, MICHIGAN.

AUTOMATIC TEMPERATURE-REGULATING DEVICE FOR INCUBATORS.

1,162,947.　　　　Specification of Letters Patent.　　Patented Dec. 7, 1915.

Application filed September 29, 1913. Serial No. 792,284.

*To all whom it may concern:*

Be it known that I, WILLIS J. PERKINS, a citizen of the United States, and a resident of the city of Grand Rapids, in the county of Kent and State of Michigan, have invented a new and useful Automatic Temperature-Regulating Device for Incubators, of which the following, taken in connection with the accompanying drawings, is a specification, disclosing a preferred form of the invention.

This invention relates to incubators of the multiple or colony type in which a plurality of incubators or incubator compartments are supplied with the heat necessary for their operation from a single source.

Figure 4:
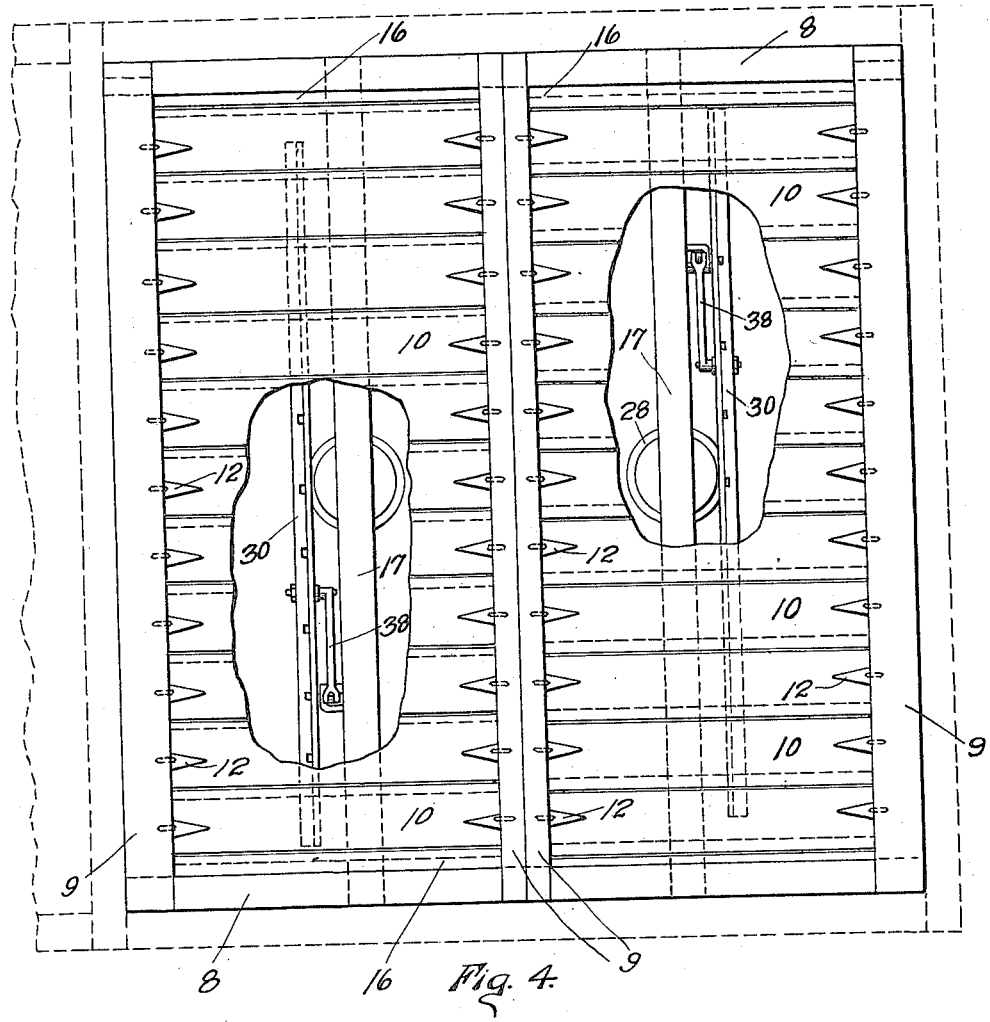
Figure 5:
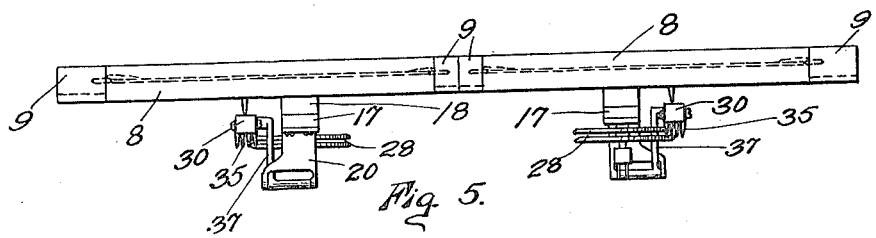

Among the objects and purposes of my invention are the automatic controlling of heat for each separate and individual compartment of the incubator in such manner that the temperature of each compartment will be held at substantially a predetermined degree; the automatic control and regulation of the heat and temperature for each compartment through interposition of means between the heat source for each compartment and the egg receiving compartment or chamber thereof which intercepts and cuts off the heat radiation from the heat source for the compartment when a predetermined degree of temperature is reached, and which permits the passage of heat from said source to said egg receiving chamber when the temperature falls below such predetermined degree; the automatic regulation of the temperature of each egg receiving chamber through temperature affected means located in proximity to the egg trays in the compartment; the automatic regulation of the temperature of each egg receiving compartment by cutting off or admitting heated air to said compartment with the reaching and the falling below of the desired degree of temperature; the automatic cutting off of all heat from an egg receiving compartment when the door thereof is opened; the manual effecting of the cutting off of all heat from any compartment of the colony at will, as when said compartment is not in service while others of the compartments are or may be; and this function being performed irrespective of the position of the door of the compartment; and if desired, the manual adjustment for the passage of heat to the egg chamber of a compartment of the colony when the door closing the chamber is opened; the cutting down of the size of the incubator compartments in height due to the fixed position of the egg trays in a single horizontal plane where heretofore the standard practice with one exception has been to intermittently raise and lower the egg trays in their compartments, necessitating that said compartments be made of considerable height as the trays are positioned in proper temperature zones at varying planes; the regulation of the temperature in an egg chamber through admission of heat predicated upon the temperature of the chamber itself. These purposes and functions, together with many others not specifically enumerated will be evident as understanding is had of the construction shown in the drawings outlining a preferred embodiment of the invention and in which, Figure 1 is a diagrammatic front elevation of a series of incubator compartments connected to and receiving heat from a single source. Fig. 2 is a transverse section from front to rear of one of the compartments of the colony incubator. Fig. 3 is a view in plan of the construction below the broken line *a—a*, Fig. 2. Fig. 4 is a plan with parts broken away, of the shutter device or heat cut out arrangement interposed between the heat supply means for a compartment and the egg receiving chamber of said compartment. Fig. 5 is an end view thereof. Fig. 6 is an enlarged plan view of a fragment of said shutter or cut out device. Fig. 7 is a side elevation thereof with parts removed for sake of clearness in showing. Fig. 8 is a section through a part of the shutter members to illustrate the construction thereof. Figs. 9, 10, 11 and 12 are fragmentary views of a shutter member showing respectively, a longitudinal section a plan, an end view, and a central longitudinal section of the shutter member and mount therefor. Fig. 13 is a fragmentary sectional and side view of the shutter members in partially open position.

Similar reference numerals refer to similar parts throughout the several views of the drawing.

My invention is an accessory adapted to be applied to the individual compartments of colony incubators now in service or hereafter manufactured, the compartments each being supplied with heat from a single heat source.

In Fig. 1, I have indicated a plurality of compartments 1, which may be separate from each other but which, preferably, are built contiguous as shown on the right in said figure, and a heater of any preferred type may be used as shown at 2 to heat water, air, or other fluid, which may be carried in suitable pipes 3 adjacent to or through the colony compartments, branches 4 being shown as carried into each compartment from the main supply pipes 3 and thence extended horizontally as at 5 across the compartments near the top thereof. Of course, the source of heat supply specifically indicated is not essential to the working of the structure, any other equivalent source such as hot air introduced into the compartments, electric coils or other electrical apparatus capable of giving off heat, and the like being adapted to be used. Each compartment may have a door 6 at the lower front portion thereof hinged so as to swing outwardly and it is through such door or doors that the egg trays 7 are placed in and removed from the compartments. The doors, preferably, have glass panels whereby a limited visual inspection of the interior of the compartments is permitted. The foregoing description applies to practically any of the standard incubator constructions of the colony or multiple compartment type.

The heated fluid passing through the pipes 5 near the top of the incubator compartments, heat is given off by radiation or otherwise from such heat source, causing the space above the air valve member in the compartment hereafter to be described, to have increased temperature. For the hatching of eggs, the temperature about the eggs should be about 103 degrees Fahrenheit, and it is one of the principal objects of my invention to continually maintain a uniform temperature in the egg chamber of each compartment of the colony and at such stated degree of temperature. To this end, I have mounted immediately beneath the source of heat in each compartment, shutter or air valve members which are adapted to open and close allowing the passage of heat from the vicinity of or from the heat source through such members when opened to the chamber below, and stopping the passage thereof when closed. I have shown two such air valve members of the shutter type mounted horizontally one back of the other in each compartment, though the specific number of such members and specific construction thereof is not material and may be varied to suit conditions. In structure, each of such members may be substantially identical, together with the operating means therefor, so that the description of one may suffice for all.

Each valve or shutter member includes a suitable supporting frame comprised of front and back pieces connected by end pieces 8, thereby forming an open frame in the front and back pieces 9 of which may be pivotally mounted the movable members 10 which are adapted to turn on their pivots 11, the members 10 being mounted in relation to each other that when they are all positioned horizontal they form a substantially solid partition between the heat source 5 and the egg receiving chamber of a compartment, but when turned at an angle to the horizontal, openings are made of proportionate variable uniform areas between said movable members permitting the passage of heat to the egg receiving chamber below. The members 10 may be stamped from sheet metal with upwardly projecting embossings formed at each end thereof as shown at 12 with ears 13 turned downwardly at the ends thereof, which ears are pierced centrally of the members to receive the pivot pins 11, this preferred construction being illustrated in Figs. 9 to 12 inclusive. Each member for interlapping efficiency at one edge thereof may be bent downwardly at an angle as shown at 14, and on one side each member may be covered with material which will not readily conduct heat, such as asbestos or other heat resistant material, this preventing heat radiation when the members are closed. In Fig. 8 this material is indicated at 15, and it is evident that with the members 10 located substantially horizontal and with the edge of each member contacting and interlocking with the angularly turned edge of its adjacent member, there is formed a practically impervious barrier so far as the passage of heat therethrough is concerned. Those members 10 nearest the ends of the frame in which they are mounted are adapted to contact with stationary members 16 secured in fixed position to the frame.

As a means for controlling the movements of the pivoted members 10 I have provided the following construction: Lying parallel to the members 9 of the frame of a shutter member and spaced a short distance below the plane of said frame may be located the bar 17, which may be secured fixedly in place between the frame members 9 and attached to the members 8 by the blocks 18. Two brackets 19 and 20 may be attached to the underside of said bar and project downwardly therefrom, the brackets being spaced a distance apart and bracket 19 located nearer the middle of the bar than bracket 20. Bracket 19 is shown as provided with spaced apart arms 21 between the ends of which may be mounted the lever 22 with arms extending to either side of its pivot point, one of such arms terminating in a weight or balance member 23, and the end of the other arm having pivotal attachment to the upright link 24 which is pivotally secured at its other end to the end of one arm 25 of a bell crank lever pivotally mounted between the spaced apart arms 26 of the other bracket 20. Between the pivot of lever 22 and the weight 23, the lever may be threaded to receive a temperature regulating adjusting screw 27, and between the upper end of this screw and the bar 17, temperature affected elements 28 may be mounted, the construction shown being thermostatic wafers spaced apart horizontally and having attachment to supporting members or columns 29 which bear against the under side of the bar 17 and the upper end of screw 27. Preferably, these wafers are located substantially at the center line of the shutter frame midway between the ends thereof though this positioning is not essential to the working of the device. There may be a greater or less number of wafers than shown, the number being varied as desired.

Lying parallel to the bar 17 and spaced a distance therefrom is a bar 30 which may extend nearly from one end frame member 8 to the other. It is free from any connection to the shutter frame, being supported at substantially the same horizontal level as bar 17 by means of the depending spring members 31 which in turn are connected to and supported by depending ears 32 riveted or otherwise suitably secured to the movable members 10 of the shutter. Such ears may be secured to members 10 a short distance from the line connecting the pivot centers of the members 10 so that movement of the ears about said centers and in a direction parallel to the front and back of the shutter frame will tend to rotate the members 10 on their pivots to operate them for closing and opening. Spring members 31 each comprise a longer vertical portion 33 which is attached to an ear 32 extending therefrom downwardly through an opening 34 in the bar 30 after which it is formed into a spring coil 35 the end of which is extended upwardly making a shorter portion 36 lying alongside the bar 30 and secured thereto. It will be noted in this connection that the openings 34 are of comparatively great width to receive the part 33 and that said parts 33 lie snugly against one side of the openings. The importance of this structure will be apparent later.

The bell crank lever mounted between the arms 26 of the bracket 20 has an upwardly projecting arm 37 which is offset a distance from the plane of arm 25, the upper end of arm 37 being pivotally connected to one end of a link 38 lying between bars 17 and 30 and having connection at its other end to bar 30. Between the end of lever 22 and its pivot and against the upper side thereof bears the coiled spring 39, it being located between the bar 17 and lever 22 and normally acting to force the screw 27 into contact engagement with the column 29 supporting the thermostatic wafers and overcoming any tendency for the balance 23 to drop below its proper position.

The operation of the structure so far described will be apparent. With the heater 2 in operation, the specific heat source for each compartment above the valve or shutter members will be raised in temperature through heat supplied from said heater. Normally, if the temperature in the egg chambers under the shutter devices is below the desired degree, the shutter pivoted members 10 will be opened as hereafter described and the heated air from above will pass through and into said chambers serving to raise the temperature thereof. With the rise in temperature, the thermostatic wafers expand, operating to turn the lever 22 on its pivot and compressing spring 39 and elevating the link 24 and through the connected arms 25 and 37 and the link 38 causing the bar 30 to have lengthwise movement, carrying spring members 31 with it and in this manner causing the shutter members 10 to approach closed position. It will be noted that in this movement the vertical parts 33 of the spring members 31 will not be positively and rigidly moved with the bar 30 but that the enlarged openings 34 will permit play of said vertical parts if necessary through the yielding of the coils 35 whereby the closing of the shutter members is accomplished through yielding spring pressure. In this manner, if any member 10 comes into contact with its adjacent member before the other members or any of them are in entirely closed position, the spring member 31 connected to such entirely closed member 10 will yield and permit additional movement of the bar 30 lengthwise to effect the closing of other members 10 which may be partially open. But when the movement of the bar 30 is in the reverse direction to open the shutter, the vertical parts 33 of members 31 are moved positively because of the positive engagement of a side of the openings 34 with their associated vertical portions 33. This is an important structural detail whereby the members are insured against being more or less partly open when it is required that the heat be cut off from an egg chamber while the positive opening thereof is provided for when the heat is to be admitted to said chamber. The thermostatic elements are so positioned and designed that when the temperature reaches the desired degree in the egg chamber of a compartment, the shutters are closed, but with the falling of the temperature, however slightly, the shutters are opened through the contraction of the thermostatic elements whereby the spring 39 is allowed to expand and move the bar 30 to open said shutter the opening being proportionate to the fall in temperature.

In the operation of colony incubators there are or may be times when certain of the compartments are in use in hatching eggs while others are empty. Again, at regular stated intervals during the period of incubation, the eggs must be cooled for a certain period of time either by removal of the trays from the compartment or by cooling the compartment by cutting off the heat therefrom. In such cases it is evident that heat should not be supplied to the compartments. If a compartment is not in service, it may be desirable that the door remain closed; and with compartments in service, but with the eggs removed for cooling, it is or may be desirable that the doors remain open. To save the heat that would otherwise be wasted, and to make it possible to automatically shut off the heat from an egg chamber with the opening of the door thereto, and automatically permit the before described mechanism to act as set forth with the closing of the door, or to manually effect the complete shutting off of the heat with the door closed, or the working of the device with the door open, I have designed the mechanism now to be described.

Secured to the members 9 of the front shutter member in the incubator compartment are the brackets 40 and 41, and a similar bracket 42 is secured to the front member 9 of the frame of the rear shutter member. Each of these brackets extends downwardly and at the ends thereof are pivoted the levers 43, 44 and 45, respectively, each lever being pivoted between its ends to its bracket. The ends of levers 44 and 45 are connected by the link 46 and a similar link 46′ may connect the other end of lever 44 with lever 43 a distance from one of its ends as shown in Fig. 2. It will be noted that the free ends of levers 43 and 45 extend to just beneath the levers 22 used with the front and rear shutters respectively, and that they may be positioned directly beneath or substantially beneath the compression springs 39 located above the levers 22. The front end of lever 43 may be widened as at 43′ and extend to near the front wall of the compartment and between said widened end and the shutter frame member 9, a strong coiled spring 47 may be placed, this spring normally being under compression and tending to operate the free ends of levers 43 and 45 against the under sides of the levers 22, said spring 47 being sufficiently strong to overcome springs 39. Pivotally attached to the lever 43 a distance from the front end thereof and below the widened portion may be the member 48 which may extend forward parallel with said widened portion for a distance and then inclined upwardly as at 49, passing in front of the front end of lever 43, thence extending vertically a short distance and terminating in the horizontal-hook-like part 50. Secured in fixed position on the door 6 of the compartment is the bracket 51 which carries the roller 52, and secured to the front member of the compartment above the door is a projection 53 located to one side of the plane of the lever 43.

Let it be supposed that Fig. 2 illustrates a compartment of a colony incubator that is in use. In such case with the door closed the roller 52 will press against the incline 49 of member 48, causing the elevation of the front end of lever 43 and compressing the front spring 50. By the elevation of the front end of lever 43, the rear end thereof and the rear end of lever 45 will be lowered and will not engage in any manner with levers 22, thus leaving the automatic shutter devices free to operate as previously described. When the door is opened to permit removal of the eggs, or for any other purpose, however, the roller 52 will be carried away from the incline 49 and the spring 47 being free to act will cause the elevation of the rear ends of levers 43 and 45 against the levers 22, compressing springs 39 and causing movements of the bars 30 and attached mechanism whereby the pivoted shutter members will be closed and held closed so long as the door is open, but with the closing of the door, the influence of the spring 47 is overcome and the automatic arrangement acts freely as before. This will be the operation when the compartment is in use. If the compartment is not in use, however, though other compartments of the colony are and heat is being carried to the compartment through the elements 5, and it is desired to prevent the entrance of any heat into the egg receiving chamber when the door is shut, it is accomplished by turning the member 48 laterally on its pivot as indicated in dotted lines, Fig. 3, so that the roller 52 will not be in line therewith, in which case the shutting of the door has no effect on the spring 47 and the shutters are held closed thereby irrespective of the temperature of the egg receiving chamber. It will be evident that the heat saved by this operation, when a compartment is not in use is a very material item in the economy of operation, incubator compartments necessarily having open bottoms for purposes of ventilation and entrance of moisture, and such open bottoms passing away a great amount of heat. If at any time it is desired to heat the egg receiving chamber or pass heat thereto when the door is open, this can be accomplished by turning the member 48 on its pivot laterally until the hook-like end 50 thereof comes above the projection 53, this projection serving to hold the front end of lever 43 in elevated position and removing the influence of spring 47 tending to close the shutter or air valve members.

From the foregoing it is clear that I have provided a practical and working structure which will accomplish the purposes and functions enumerated in the statement of the invention.

Various changes in structure will occur to others skilled in the art and have occurred to me without departing from the essential features and principles of my invention. I have shown and described a complete and operative structure, but such specific disclosure is not to be taken in any sense as limiting the invention to the specific form described. The invention is defined in the claims appended hereto, and I consider myself as entitled to all modifications in structure falling within the scope thereof.

What I claim as new and desire to secure by Letters Patent is,—

1. In a mechanism of the character described, a plurality of incubation compartments, each having an egg-receiving section, means to supply heat to each egg-receiving section of said compartments from a single fixed supply source, a door to each compartment, means to automatically regulate the temperature of each egg-receiving section to a certain predetermined degree, said regulation taking place independently in each compartment, and means operated by the door of each compartment to permit operation of the automatic regulating means when the door is shut but preventing operation thereof when the door is open.

2. In a mechanism of the character described, a plurality of incubation compartments, means to supply heat to each of said compartments from a single supply source, an air valve located between the heat supply for each compartment and the egg-receiving section thereof, means for automatically operating said air valve through temperature affected devices whereby heat will be shut out of the egg-receiving section on attainment of a certain degree of temperature and will be permitted entrance into said section when the temperature falls below said degree, a door to the egg-receiving section and means to render the automatic control inoperative upon opening the door, said means operating automatically to close off the heat entirely from the said egg-receiving section upon opening said door.

3. In a device of the character described, an incubation compartment having heat carrying elements therein, an egg-receiving section in said compartment, a shutter comprised of a plurality of connected pivotally mounted elements interposed between said egg-receiving section and the heat carrying elements, said shutter forming the entire partition between the egg-receiving section and the heat carrying elements when closed and permitting the entrance of heat evenly upon eggs in said egg-receiving section when open, said shutter elements adapted to open and close to permit the entrance of heat into and to cut off the heat from said egg-receiving section, and means automatically operated with reference to the temperature of the egg-receiving section and operatively connected with the shutter to thereby open and close the same.

4. In a device of the character described, a plurality of incubation compartments, a single source of heat supply for all of the compartments, egg-receiving sections in the compartments, doors partially closing the fronts of the compartments and permitting access to said egg receiving sections, means automatically controlling the heat supplied to each egg-receiving section independently of the other sections, said means automatically closing off the heat to a section when it attains a predetermined degree of temperature, and means whereby upon opening the door to a section, the heat will be shut off therefrom so long as the door is open.

5. In a device of the character described, an incubation compartment having a means of supplying heat thereto, an egg-receiving section in said compartment, a plurality of connected and simultaneously operable opening and closing means located between the egg receiving section and the heat supplying means, thermostatic elements operatively connected with said opening and closing elements and operating to close them when a certain predetermined temperature is attained in the egg-receiving chamber, and permitting said elements to open when the temperature falls below said predetermined degree, and means whereby said opening and closing elements will be yieldingly closed and positively opened.

6. In a device of the character described, an incubation compartment having a means of supplying heat thereto located in an upper plane thereof, an egg receiving section located in said compartment at a lower plane, opening and closing elements interposed at an intermediate plane, spring means tending to open said elements and temperature affected means operating to close said elements against the influence of the spring means on the increase of temperature and consequent expansion of said temperature affected means.

7. In a device of the character described, a plurality of incubation compartments each having an egg-receiving section, a common heat supply source for the compartments, doors through which access may be had to the egg-receiving sections, means to independently regulate the heat passing into the egg-receiving sections, and means to automatically shut off heat from any egg-receiving section independently of the other sections when the door thereto is opened.

8. In a device of the character described, a plurality of incubation compartments each having an egg-receiving section, a common heat supply source for each compartment, doors through which access may be had to the egg receiving sections, means to independently control and regulate the heat passing to each egg-receiving section, means to automatically shut off the heat from any egg-receiving section independently of the other sections when the door is opened, and means whereby the heat may be shut off from any egg-receiving section independently of the other sections when the door is closed.

In testimony whereof, I have hereunto affixed my signature in the presence of two witnesses.

WILLIS J. PERKINS.

Witnesses:
PETER TAYLOR,
C. A. LEANTON.

Copies of this patent may be obtained for five cents each, by addressing the "Commissioner of Patents, Washington, D. C."